US012073769B2

(12) United States Patent
Huard et al.

(10) Patent No.: US 12,073,769 B2
(45) Date of Patent: Aug. 27, 2024

(54) DISPLAY PIXELS HAVING INTEGRATED MEMORY

(71) Applicant: Intel Corporation, Santa Clara, CA (US)

(72) Inventors: Douglas Huard, Portland, OR (US); Vishal Sinha, Portland, OR (US); Paul Diefenbaugh, Portland, AZ (US); Khaled Ahmed, San Jose, CA (US); Kristoffer Fleming, Chandler, AZ (US); Kunjal Parikh, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 699 days.

(21) Appl. No.: 17/131,415

(22) Filed: Dec. 22, 2020

(65) Prior Publication Data

US 2021/0150979 A1 May 20, 2021

(51) Int. Cl.
*G09G 3/32* (2016.01)

(52) U.S. Cl.
CPC ....... *G09G 3/32* (2013.01); *G09G 2300/0857* (2013.01); *G09G 2310/08* (2013.01)

(58) Field of Classification Search
CPC ............. G09G 3/32; G09G 2300/0857; G09G 2310/08; G09G 3/2088; G09G 2300/0408; G09G 3/3648
See application file for complete search history.

(56) References Cited

U.S. PATENT DOCUMENTS

| | | | | |
|---|---|---|---|---|
| 2016/0118971 A1* | 4/2016 | Sugiyama | .............. | H03K 5/249 341/158 |
| 2016/0180821 A1 | 6/2016 | Chang et al. | | |
| 2016/0351130 A1* | 12/2016 | Kikuchi | ............... | G09G 3/3233 |
| 2018/0182279 A1 | 6/2018 | Sakariya et al. | | |

OTHER PUBLICATIONS

European Patent Office, "Partial European Search Report," issued in connection with Application No. 21 19 8056, dated Mar. 16, 2022, 9 pages.
Sharp website, https://www.sharpsma.com/sharp-memory-lcd-technology, last accessed May 10, 2022, 2 pages.
Biwa et al., "The Technologies for Crystal LED Display System," Mar. 10, 2021, 4 pages, Sony Corporation, Tokyo, Japan.
European Patent Office, "Communication pursuant to Article 94(3) EPC," issued in connection with European Patent Application No. 21 198 056.0-1210, mailed on Sep. 18, 2023, 14 pages.

* cited by examiner

*Primary Examiner* — Muhammad N Edun
(74) *Attorney, Agent, or Firm* — Hanley, Flight & Zimmerman, LLC

(57) ABSTRACT

Display pixels having integrated memory are disclosed. A disclosed example memory pixel includes a light emitter on a semiconductor substrate, memory co-located with the light emitter on the same semiconductor substrate, and a comparator in circuit with the memory, the comparator to control a flow of electrical current to the light emitter based on pixel data from the memory and timing information.

22 Claims, 11 Drawing Sheets

DISPLAY PIXELS HAVING INTEGRATED MEMORY

FIELD OF THE DISCLOSURE

This disclosure relates generally to displays and, more particularly, to display pixels having integrated memory.

BACKGROUND

Some known displays, such as light-emitting diode (LED) panels, liquid crystal display (LCD) panels, organic light-emitting diode (OLED), etc., implement a display timing controller (TCON). In such known displays, a remote frame buffer (RFB) can be integrated with the TCON. In operation, the TCON drives a display using source and row driver integrated circuits (ICs). A TCON interface to the source and row driver ICs is digital while, in contrast, an interface of the source driver IC to a backplane of the display is analog (e.g., voltage for LCD displays). In operation, the aforementioned TCON selects a row of pixels via the row driver IC, and drives each column of pixels of a corresponding row using the source driver IC. The display is updated by repeating the above process for each row and corresponding frame.

Figure 1:
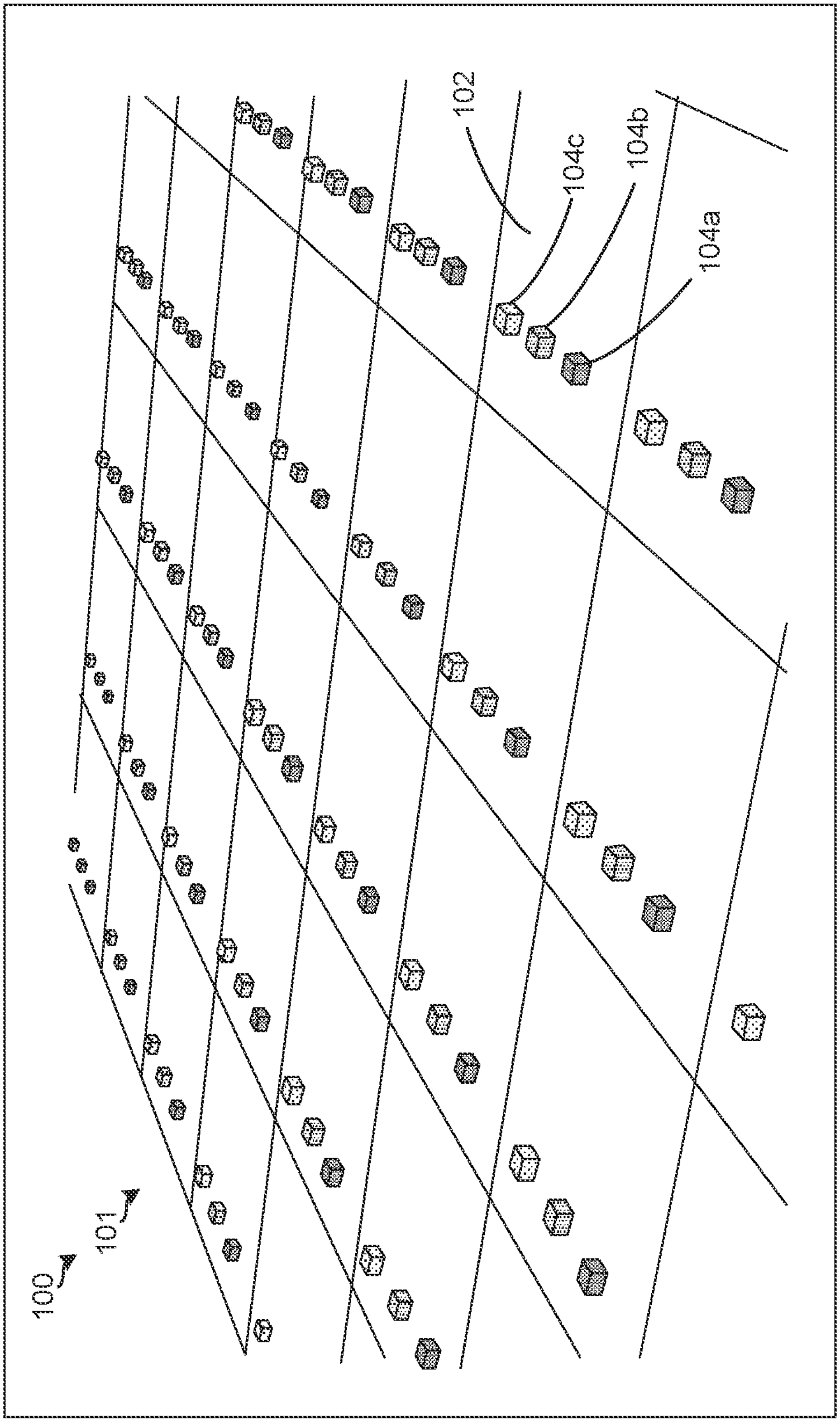
FIG. 1 illustrates a display in which examples disclosed herein can be implemented.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. Notwithstanding the foregoing, in the case of a semiconductor device, "above" is not with reference to Earth, but instead is with reference to a bulk region of a base semiconductor substrate (e.g., a semiconductor wafer) on which components of an integrated circuit are formed. Specifically, as used herein, a first component of an integrated circuit is "above" a second component when the first component is farther away from the bulk region of the semiconductor substrate than the second component. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

DETAILED DESCRIPTION

Display pixels having integrated memory are disclosed. Some known displays, such as light-emitting diode (LED) panels, liquid crystal display (LCD) panels, organic light-emitting diode (OLED), etc., implement a display timing controller (TCON). In such known displays, a remote frame buffer (RFB) is integrated with the TCON. Further, the TCON drives a display using source and row driver integrated circuits (ICs). A TCON interface to the source and row driver ICs is digital while, in contrast, an interface of the source driver IC to a backplane of the display is analog (e.g., voltage for LCD displays). In operation, the aforementioned TCON selects a row of pixels via the row driver IC, and drives each column of pixels of a corresponding row using the source driver IC. The display is updated by repeating the above process for each row, and each frame. Driving each row and column of the display can involve greater than 80% of the power consumption of electronics of the display.

Examples disclosed herein enable simplified, highly-scalable and responsive display implementations. Examples disclosed herein can also be highly power efficient and manufactured in a relatively inexpensive manner. Examples disclosed herein can also exhibit superior brightness, color and high refresh rates while being relatively thin and, thus, enabling relatively compact electronic devices. Examples disclosed herein can also eliminate the need for an RFB and an analog interface. Thus, examples disclosed herein can substantially reduce or eliminate the need for analog convertors (D/A). Accordingly, examples disclosed herein can enable non-isochronous high speed digital pixel interfaces. Even further, examples disclosed herein can enable pixel grouping with reduced traces and gates per pixel.

Examples disclosed herein implement an integrated memory display pixel (e.g., an integrated pixel assembly, a fabricated pixel component, etc.) that includes a light emitter and micro circuitry. The pixel includes memory, which can be implemented as a static random access memory (SRAM) device, for example, and is mounted to a substrate of the pixel. Further, a comparator of the pixel controls and/or directs a flow of current to the light emitter based on data from (e.g., accessed from, retrieved from) the memory and timing information.

In some examples, the pixel is coupled to a display backplane. The display backplane can include integrated fabricated micro circuitry to be electrically and/or communicatively coupled with the pixel. In some examples, the pixel is transferred onto the display backplane during manufacture of a display (e.g., a display panel). In some examples, multiple pixels are grouped together to be controlled by at least one memory component (e.g., a single memory component).

As used herein, the term “pixel” refers to a discrete unit of a display that is individually illuminated to define a portion of an image or information presented on the display. Accordingly, the term “pixel” can refer to an integrated circuit and/or semiconductor device that is placed onto a portion of a display. As used herein, the terms “control circuitry,” “micro circuit” and “micro circuitry” refer to circuitry that is implemented to control a light emitter of a corresponding pixel, fabricated pixel semiconductor device, pixel grouping and/or pixel assembly.

FIG. 1 illustrates a display 100 in which examples disclosed herein can be implemented. The example display 100 is implemented using a micro-LED (μLED) panel and includes a display panel (e.g., a panel array) 101 having an array of pixels 102 mounted thereon to display images. The example pixels 102 of the illustrated example are implemented using μLED pixel technology. The pixels 102 can include corresponding light emitters 104 (hereinafter 104*a*, 104*b*, 104*c*, etc.), which are implemented as μLED sub-pixels having a footprint of approximately 4 micrometer (μm) by 4 μm in this example. In some examples, the pixels 102 have a rectangular overall shape.

In operation, multiples ones of the pixels 102 are operated (e.g., illuminated and/or color emitter operated) at different times (e.g., with different timing sequences) to display a two-dimensional image onto the display 100 for a user. In particular, a signal is provided to the display 100 and different ones of the light emitters 104 are driven and/or controlled at a given image (e.g., a video frame, a still picture, etc.) of the signal. In particular, different ones of the light emitters 104 are provided with a current based on the signal. In this example, each of the pixels 102 includes three different ones of the light emitters 104, all of which emit either a red color light, a green color light or a blue color light.

Examples disclosed herein enable relatively power-efficient and quick responding displays by utilizing integrated memory, such as SRAM, on a pixel (e.g., in-pixel memory). The integrated memory enables pixel instructions to be offloaded from other display drivers, thereby saving energy and increasing computational efficiency to drive displays. For example, a pixel drive circuit is offloaded within the display backplane 101, thereby resulting in streamlining of circuitry related to driving the pixels 102. The aforementioned memory can help simplify the pixel driving logic and/or circuitry since the memory is updated only when there are changes to the pixel, rather than periodically at a given refresh rate for known display panels, for example. Examples disclosed herein utilize the memory to store pixel and/or frame data and, in turn, operate corresponding light emitters based on the data, as opposed to driving entire rows and columns of pixels simultaneously in known implementations. Accordingly, some examples disclosed herein can reduce an effective refresh rate of a respective display.

Figure 2B:
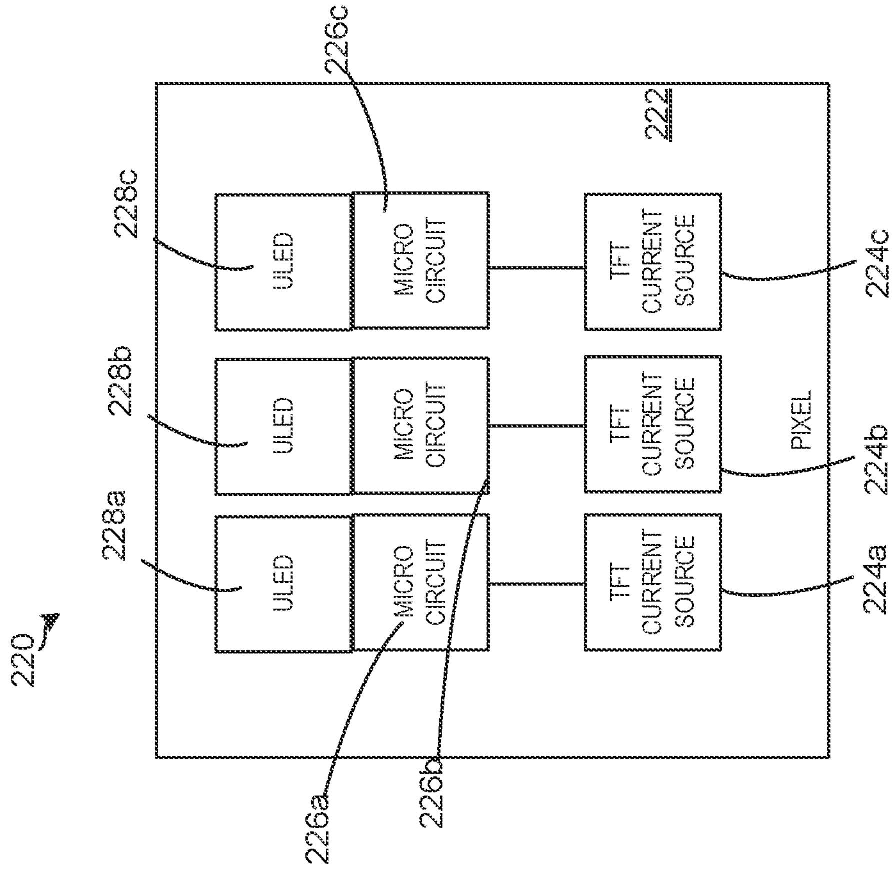
FIGS. 2A and 2B depict example pixel circuits in accordance with teachings of this disclosure.
Figure 2A:
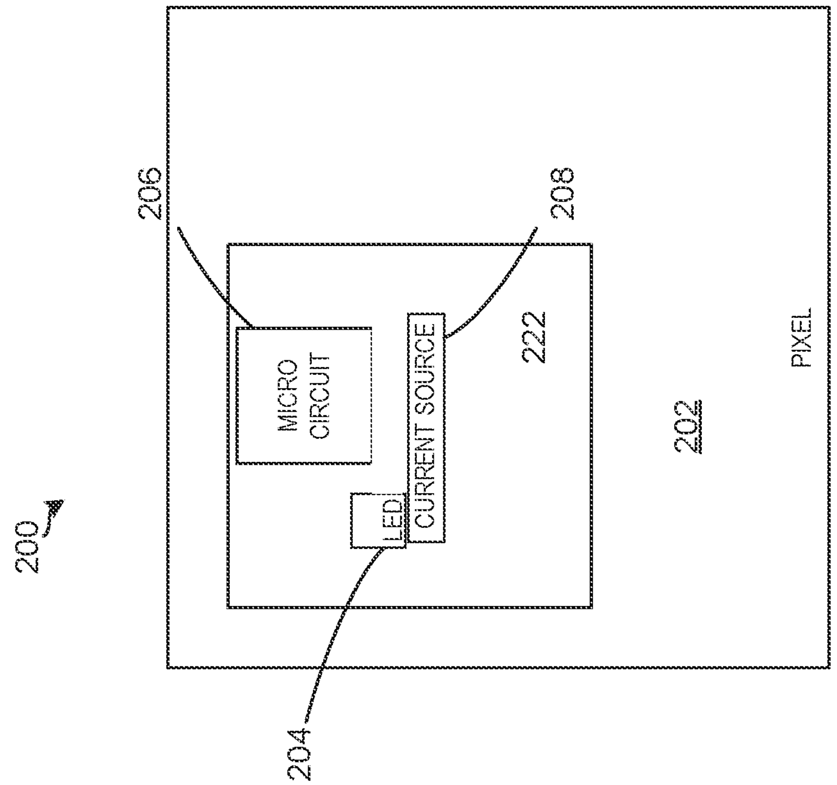

FIGS. 2A and 2B depict example pixel circuits in accordance with teachings of this disclosure. FIGS. 2A and 2B depict examples in which LEDs, micro circuits and current sources are produced together on a same process (e.g., on a same wafer in a semiconductor process), and transferred to the display backplane 101. Turning to FIG. 2A, an example pixel 200 is shown. In the illustrated example, the pixel 200 is implemented with LED technology and includes a substrate 202, emitters 204 with corresponding micro circuitry 206 and a current source or interface 208 (e.g., a current interface to receive electrical current from the display backplane 101 shown in FIG. 1). In this example, the pixel 200 includes three of the emitters 204.

FIG. 2B depicts an example pixel 220, which is implemented as a pixel having a μLED sub-pixel. The pixel 220 of the illustrated example includes a substrate 222 with current sources or interfaces 224 (hereinafter 224*a*, 224*b*, 224*c*, etc.), micro circuits 226 (hereinafter 226*a*, 226*b*, 226*c*, etc.) and emitters (e.g., sub-pixels) 228 (hereinafter 228*a*, 228*b*, 228*c*, etc.).

Figure 3:
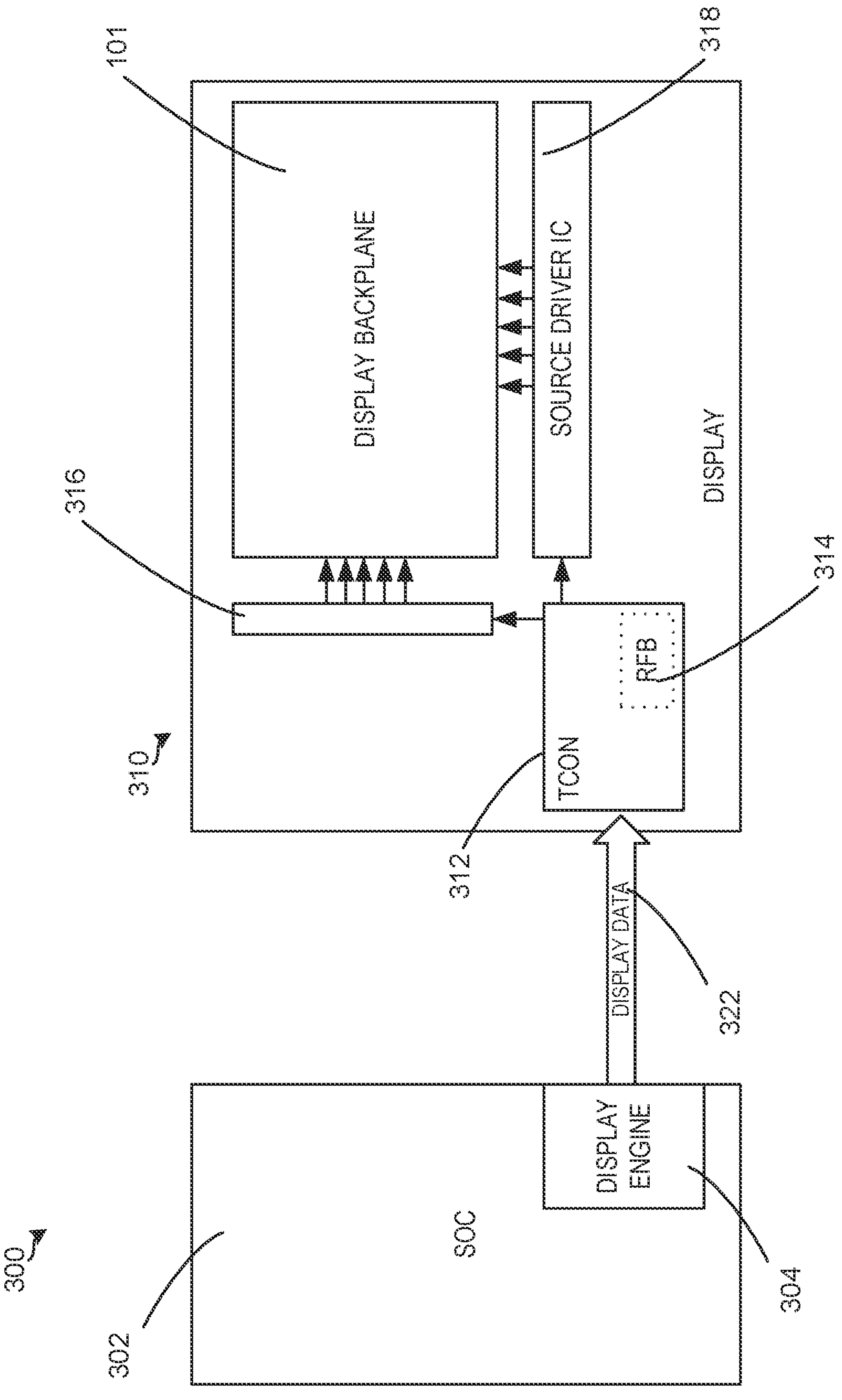
FIG. 3 is a schematic overview of an example display controller to control the display of FIG. 1 and/or the example pixels shown in FIGS. 1-2B.

FIG. 3 is a schematic overview of an example display controller 300 to control the display of FIG. 1 and/or the example pixels 102, 200, 220 shown in FIGS. 1-2B. The display control system 300 of the illustrated example includes a system on a chip (SOC) integrated circuit (IC) 302, which includes a display engine 304. In this example, the SOC integrated circuit 302 is in circuit with a display 310. In turn, the example display 310 includes a TCON 312 with an optional RFB 314, in some examples. The RFB 314 is not implemented in this example due to an implementation of pixels with integrated memory, as will be discussed in greater detail below in connection with FIGS. 4-11. Further, the example display 310 also includes a row driver (e.g., a row driver IC) 316, a source driver (e.g., a column driver IC, source driver IC, etc.) 318 and the aforementioned display backplane 101.

In operation, the example display engine 304 processes and/or converts video and/or image data to be transmitted to the display as a display data signal (e.g., an embedded DisplayPort (eDP) data signal) 322. In the illustrated example, the TCON 312 receives the aforementioned display data signal 322 and controls refresh of the display 310 using the source driver 318 and the row driver 316. In known displays, this continual refresh of a display can contribute to a substantial portion (e.g., greater than 80%) of display power consumption. Some known displays implement dynamic and/or variable refresh rates in which refresh rates are varied to lower power consumption.

Figure 4:
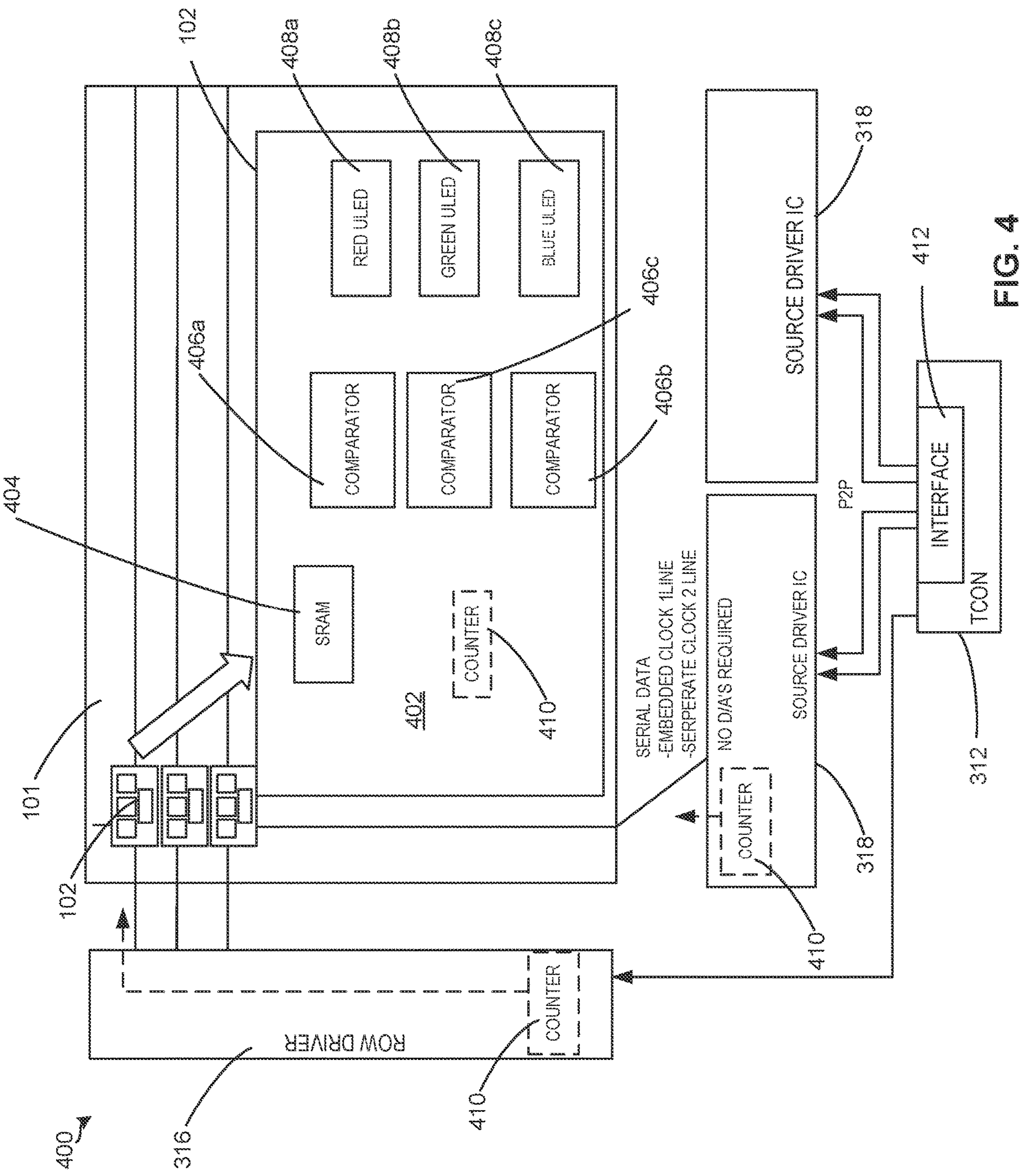
FIG. 4 is a schematic overview of an example display system in accordance with teachings of this disclosure.

FIG. 4 is a schematic overview of an example display system 400 in accordance with teachings of this disclosure. The display system 400 of the illustrated example includes the aforementioned pixels 102 mounted to the display backplane 101 and arranged in rows and columns of the display backplane 101. In this example, ones of the pixels 102 include a substrate (e.g., a body) 402, memory 404, which is implemented as SRAM in this example, comparators 406 (hereinafter comparators 406*a*, 406*b*, 406*c*, etc.), and sub-pixels or emitters 408 (hereinafter emitters 408*a*, 408*b* 408*c*, etc.). In this example, the memory 404 is co-located with the emitters 408. In some examples, each of the pixels 102 includes a counter 410. In the illustrated example, the display system 400 also includes the aforementioned row driver 316 and source driver(s) 318. Further, an example interface 412 of the TCON 312 is shown in circuit with the row driver 316 and the source driver(s) 318. In some examples, the example counter 410 is part of the row driver 316 and/or the source driver(s) 318.

In operation, the example interface 412 of the TCON 312 provides display input signals (e.g., pixel display signals, frame or line data, etc.) to the source driver(s) 318, as well as the row driver 316. Accordingly, both the example row driver 316 and the example source driver(s) 318 direct operation of the pixels 102. In this example, the row driver 316 and the source driver(s) 318 control both intensity (e.g., light intensity) and color display (e.g., color output) of the pixels 102 based on frame and/or image data. In this example, the pixels 102 receive serial data from the row driver 316 and the source driver(s) 318, as well as clock information (e.g., embedded and/or separate clock lines). The operation of the example pixels 102 is described in greater detail below in connection with FIG. 5.

Figure 5:
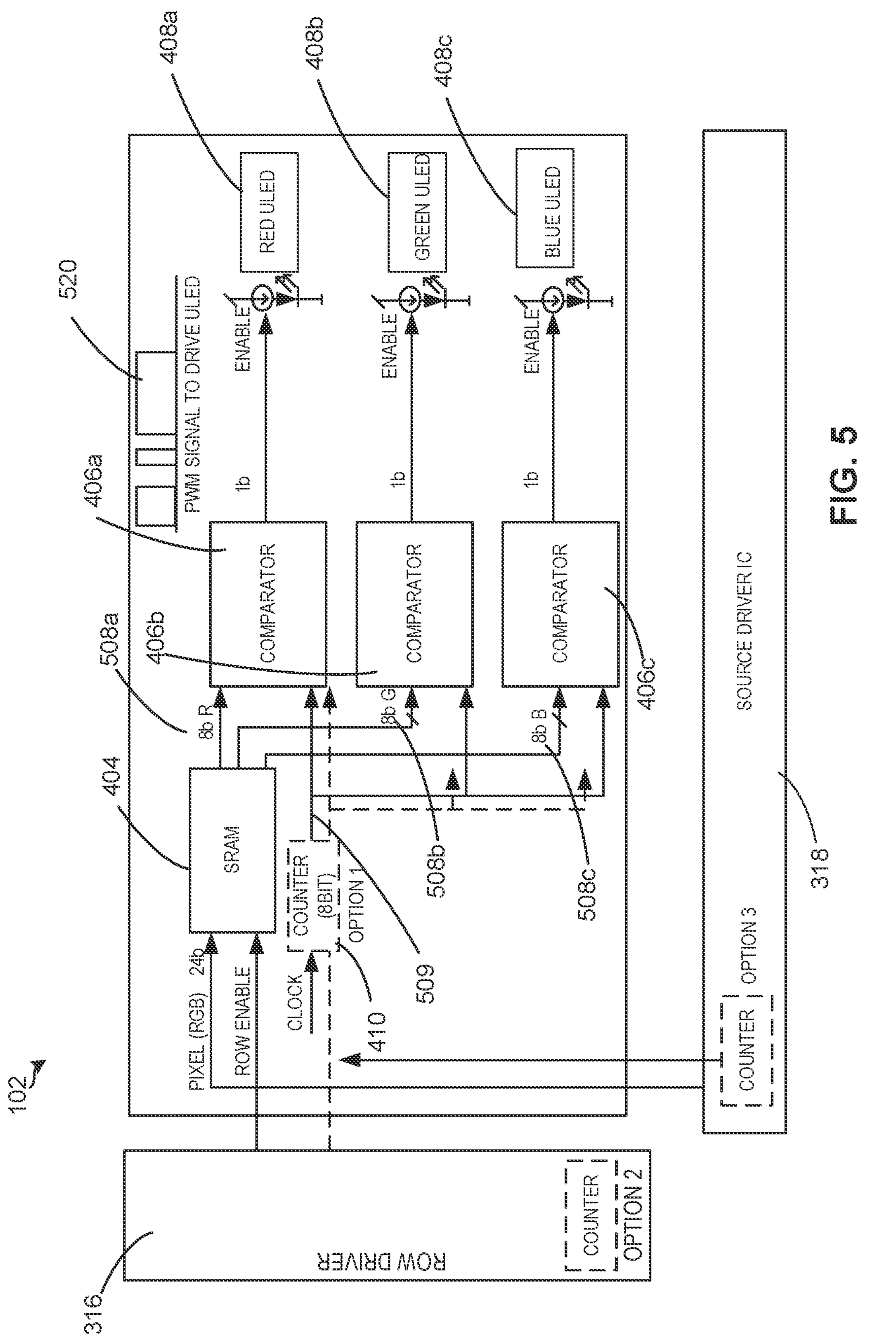
FIG. 5 is a schematic overview of example pixel drive circuitry in accordance with teachings of this disclosure.

FIG. 5 is a schematic overview of example pixel drive circuitry of the example pixel 102 of FIGS. 4 and 5 in accordance with teachings of this disclosure. According to the illustrated example, the pixel 102 is communicatively coupled to both the row driver 316 and the source driver 318. In particular, the example pixel 102 receives display signals from both the row driver 316 and the source driver 318. As mentioned above in connection with FIG. 4, the counter 410, which is implemented as an 8-bit counter in this example, can be implemented on the pixel 102, the row driver 316 or the source driver 318.

To control operation of the example pixel 102, pixel data (e.g., pixel instructions as a function of timing) and row enable data are provided to the memory 404. In turn, the example memory 404 provides pixel data 508*a* to the comparator 406*a*, second pixel data 508*b* to the comparator 406*b* and, likewise, third pixel data 508*c* to the comparator 406*c*. In this example, the first pixel data 508*a*, the second pixel data 508*b* and the third pixel data 508*c* correspond to the colors red, green, blue, respectively. In this example, the first, second and third pixel data 508*a*, 508*b*, 508*c* are identical (e.g., the comparators 406*a*, 406*b*, 406*c* utilize the same pixel data). In other examples, the first, second and third pixel data 508*a*, 508*b*, 508*c* are different from one another. The example comparators 406*a*, 406*b*, 406*c* utilize the first, second and third pixel data 508*a*, 508*b*, 508*c*, respectively, in conjunction with clock/timing data 509 to control outputs therefrom. In particular, the example comparators 406*a*, 406*b*, 406*c* of the illustrated example control an amount of electrical current to the respective emitters 408*a*, 408*b*, 408*c*, thereby controlling an illumination and light intensity thereof. In this example, time-based and/or timing based pixel control instructions are included in the first, second and third pixel data 508*a*, 508*b*, 508*c*. In other words, the comparators 406*a*, 406*b*, 406*c* control operational states of the respective emitters 408*a*, 408*b*, 408*c* using the first, second and third pixel data 508*a*, 508*b*, 508*c* in conjunction with timing information of the clock/timing data 509 from the counter 410. In regard to the clock timing data 509, the example TCON/timing controller 312 (FIGS. 3 and 4) controls timing and/or a timing reference for operation of the pixels 102. The example TCON 312 selects a row of the pixels 102 with the row driver 316, and drives corresponding ones of the column pixels 102 of that row using source driver 318. The display is updated by repeating the above process for each row, and then for each frame, for example. By implementing the memory 404, examples disclosed herein enable discretized computing for execution of pixel instructions.

Accordingly, examples disclosed herein can reduce (e.g., eliminate) timing dependencies of the aforementioned SOC 302. In some examples, the SOC 302 transfers data, such as, data pertaining to an entire frame and/or "dirty" region of at least one of the pixels 102 that are suspended in a state, as the data is ready for the TCON 312 associated with the display 100. In effect, the example TCON 312 performs a selection of a row driver to scan-out, and transfers the data to the source driver 318. The example source driver 318 can then serially transmit the data out to each one of the pixels 102 of the selected row via the corresponding memory 404. This process may repeat until all "dirty" pixels are updated, for example.

In some examples, the data is clocked through either a horizontal (row) or vertical (column) shift register. In an example of a 4K display that is data clocked vertically, a shift register with approximately 2000*24=48K flip-flops (e.g., an element that stores 1 bit of data) can be implemented. This can result in all of the data arriving at the pixels 102 at a similar time and/or simultaneously (e.g., no rasterization). In some examples, each flop only has one load, as does the column driver if a clock is buffered at each one of the pixels 102. In another example, data is "broadcast" to all of the pixels 102 in a column simultaneously, and the row driver 316 selects the proper row to receive the data. In some such examples, pixel structures that use complementary metal-oxide-semiconductor (CMOS) transmission gates are enabled by the row driver 316 to "disconnect" every row other than the relative row. As a result, a capacitive load of a CMOS transmission gate is substantially lower than the capacitive load into a CMOS logic element. From a timing perspective, some examples disclosed herein advantageously drive data to all columns simultaneously, and this data transmission over a frame time can require one or two rows of storage in column drivers and, thus, the resulting clock frequency can be relatively slow: 24 bits/pixel*2000 rows*60 Hz=2.88 megahertz (MHz) clock for a 4K display at 60 frames per second (fps).

In some examples, a pulse wave modulation (PWM) waveform, such as a signal waveform 520 shown in FIG. 5 is implemented to drive and/or direct operation of the emitters 408*a*, 408*b*, 408*c*. In some such examples, pulse widths of the PWM waveform control a light intensity of the emitters 408*a*, 408*b*, 408*c*. In some examples, the first, second and third pixel data 508*a*, 508*b*, 508*c* are implemented as 8-bit signals. Additionally or alternatively, the counter 410 operates as an 8-bit counter. In some examples, the memory 404 buffers pixel data for processing by the comparators 406*a*, 406*b*, 406*c*. In some examples, the emitters 408*a*, 408*b*, 408*c* are enabled or disabled by 1-bit signals from the respective comparators 406*a*, 406*b*, 406*c*. In some examples, examples disclosed herein can enable an option to retain pixel values during an off-state thereof so that the pixel values can be used to instantaneously drive corresponding pixels to create a subsequent instantaneous resume. In particular, μLEDs and/or μLED emitters can be turned off by setting a voltage off while retaining an in-pixel memory value in the memory 404. As a result, due to relatively low leakage processes, the example pixel 102 and/or the memory can retain pixel values and/or instructions at a relatively low power, where, in contrast, restoring an LED voltage would usually instantaneously restore the display in known implementations.

While three of the emitters 408*a*, 408*b*, 408*c* and the comparators 406*a*, 406*b*, 406*c* are shown in this example, any suitable number of emitters and/or comparators can be implemented instead (e.g., one, two, four, five, six, ten, fifty, one hundred, etc.). Further, the example emitters 408 can emit any appropriate color light besides red, green and blue.

Figure 6:
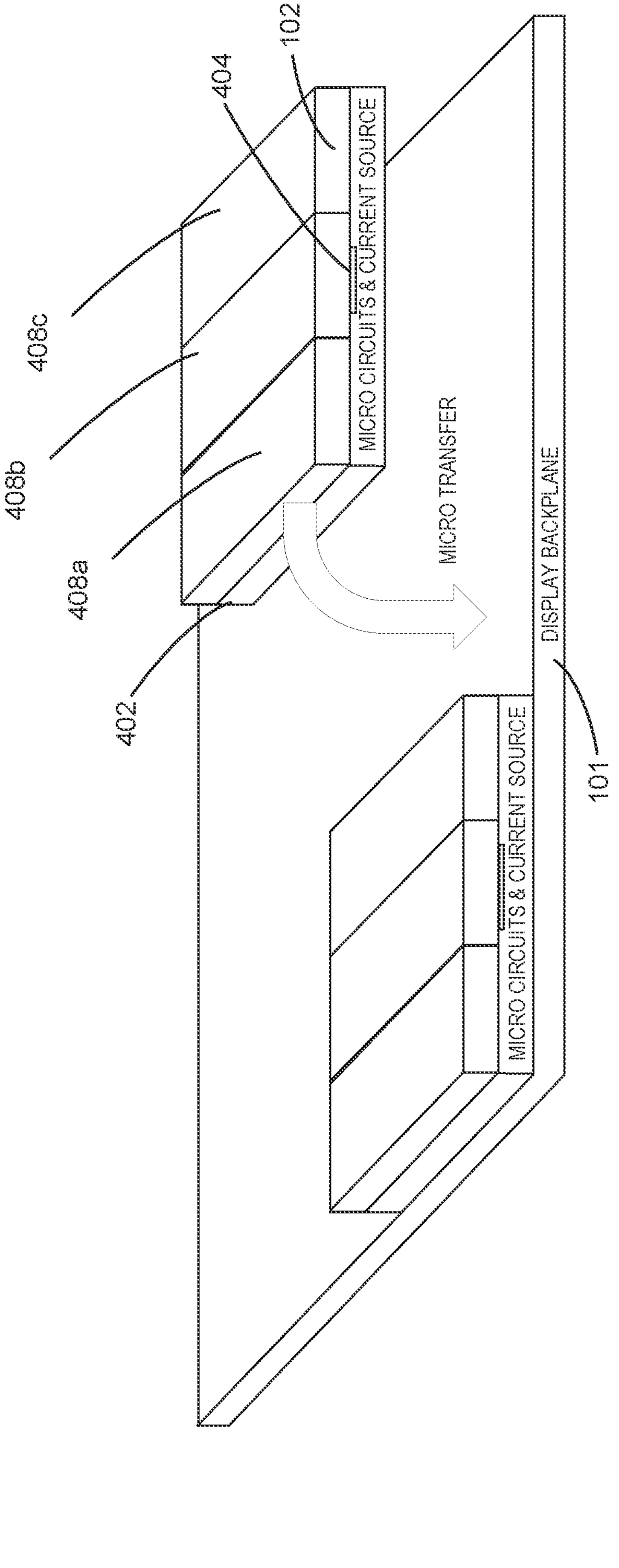
FIG. 6 depicts an example production process to produce examples disclosed herein.

FIG. 6 depicts an example production process to produce examples disclosed herein. In particular, an example fabrication and assembly process with an associated example transfer process is shown. However, any other suitable production and/or fabrication process can be implemented instead.

To fabricate the example pixel 102, the substrate 402 is processed in a multi-layer wafer process to include micro circuits, interconnects and components, such as the memory 404, the comparators 406*a*, 406*b*, 406*c*, and/or the emitters 408*a*, 408*b*, 408*c* shown in FIGS. 4 and 5. In the illustrated example, the substrate 402 is coupled (e.g., bonded, assembled, adhered, etc.) to the light emitters 408*a*, 408*b*, 408*c*. As a result, the example substrate 402 in conjunction with the light emitters 408*a*, 408*b*, 408*c* and associated micro circuits defines the individual pixel 102. In this example, the substrate 402 includes a current source or interface to receive current to operate the light emitters 408*a*, 408*b*, 408*c*.

In some examples, the memory 404, the micro circuit and fabricated electronic devices of the pixel 102 are manufactured using standard silicon (Si) complementary metal-oxide-semiconductor (Si CMOS) processes on silicon wafers. In some examples, the micro circuit can be manufactured using Si CMOS with an approximately 45 nm node. However, any other appropriate manufacturing process can be implemented instead.

In this example, to produce a display containing an array of the pixels 102, multiple ones of the fabricated pixels 102 are placed onto the display backplane 101, thereby defining a pixel array to display an image. In this particular example, the pixels 102 are assembled to the display backplane 101 via a micro transfer process. Further, circuits and/or micro-circuits that are fabricated onto the display are electrically coupled to the example pixels 102 when the pixels 102 are coupled and/or transferred to the display backplane 101. In some examples, the pixels 102 are placed on the display backplane 101 via a "pick and place" system, which can be optical-based, for example.

In some examples, micro circuits are manufactured, formed and/or fabricated on a same Si wafer as a μLED pixel utilizing Si CMOS, and the micro circuit is transferred to a corresponding display backplane. Additionally or alternatively, micro circuits are manufactured on separate Si wafers, and both the μLED pixel and the micro circuits are transferred to a display backplane. In some examples, micro circuits are manufactured monolithically on a display backplane using low-temperature Polycrystalline oxide (LPTO) CMOS technology, such as LPTO thin film transistor (TFT) displays utilizing Indium gallium zinc oxide (IGZO) for n-channel transistors and Low Temperature Polycrystalline Silicon (LTPS) for p-channel transistors, for example.

Figure 7:
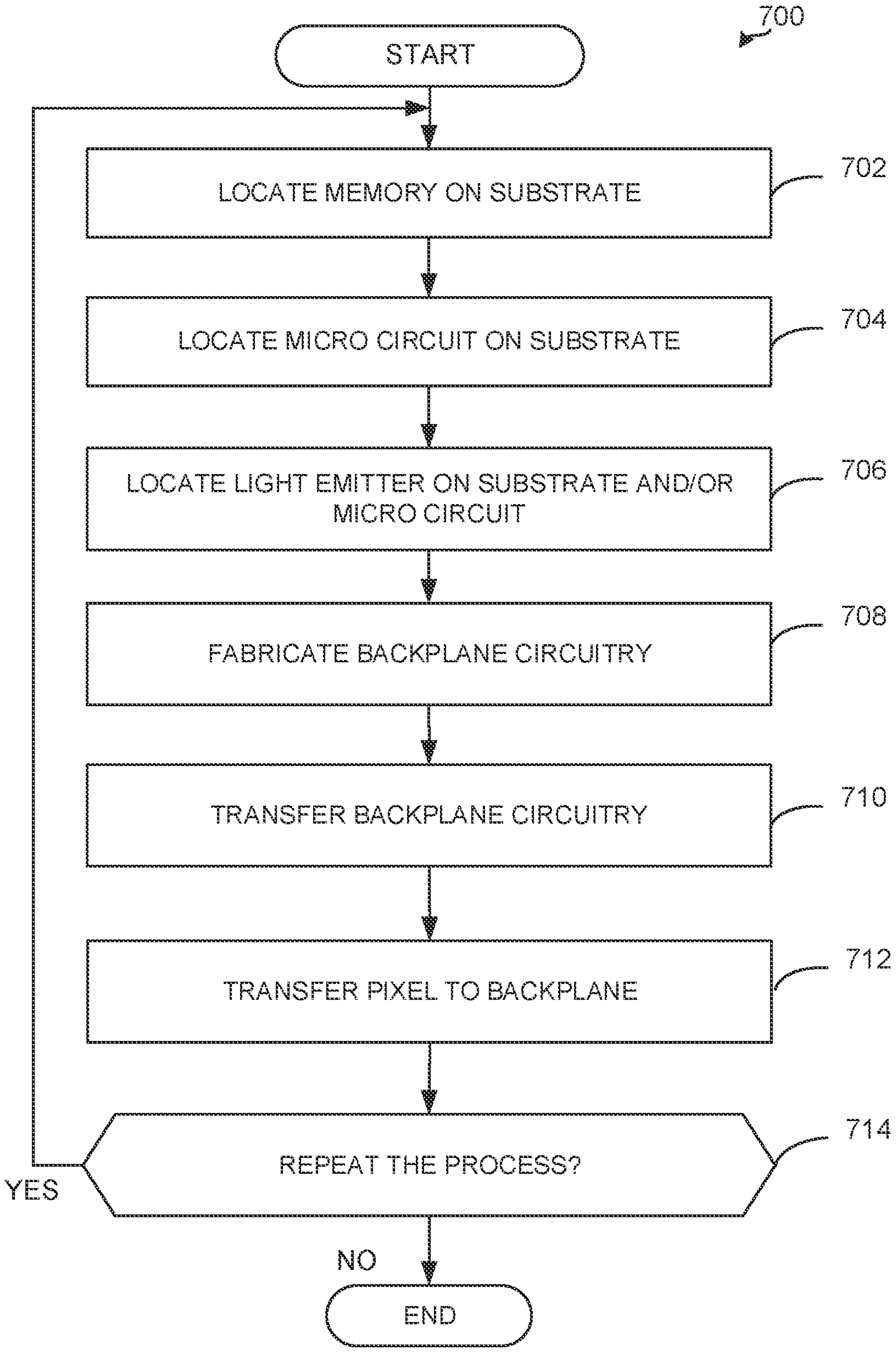
FIG. 7 is a flowchart representative of example machine readable instructions that may be executed to produce examples disclosed herein.

FIG. 7 is a flowchart representative of example machine readable instructions 700 that may be executed to produce examples disclosed herein. For example, the instructions may be executed by one or more processors of computers and/or controller(s) of a semiconductor chip fabrication line to manufacture examples disclosed herein. As such, one or more processor(s) and/or controller(s) control implementation of operations of FIG. 7 by executing instructions represented in the flowchart of FIG. 7. According to the illustrated example, the display 100 (FIG. 1) is produced with the example integrated memory pixels 102 (FIGS. 1 and 4-6) being placed onto the display backplane 101 via a micro transfer process.

At block 702, the example memory 404 is located, formed (e.g., fabricated) and/or provided on the substrate 402 (FIGS. 4 and 6). In this example, the memory 404 is formed on multiple layers of the substrate 402 via a multilayered fabrication process. In other examples, the memory 404 is placed, assembled and/or coupled onto the substrate 402. Additionally or alternatively, the example memory 404 is part of a substrate portion that is attached and/or coupled to the substrate 402.

At block 704, an example micro circuit is located, formed (e.g., fabricated) or provided on the substrate 402. In some examples, the micro circuit is fabricated together with the memory 404 (e.g., via the same fabrication or transfer process). Additionally or alternatively, the micro circuit and/or interconnects thereof are formed along with the memory 404.

At block 706, the example light emitter 408 (FIGS. 4-6) is located, formed or provided on the substrate 402 and/or the aforementioned micro circuit to define the pixel 102. In some examples, the light emitter 408 is placed onto and/or coupled to the substrate 402. In some examples, at least a portion of or an interconnect associated with the light emitter 408 is fabricated on the substrate 402.

At block 708, circuitry and/or a micro circuit of the display backplane 101 (FIGS. 1, 3-4 and 6) is fabricated. In some examples, the circuitry and/or the micro circuit, including power and signal interconnects, is fabricated on the display backplane 101 to facilitate electrical coupling of the display backplane 101 with the pixel 102.

At block 710, in some examples, the circuitry and/or micro circuit for the display backplane 101 is transferred to the display backplane 101.

At block 712, the example pixel 102 is transferred to the display backplane 101. In this example, the pixel 102 is transferred in a micro transfer process. However, any other suitable assembly or placement methodology can be implemented instead.

At block 714, it is determined whether to repeat the process. If the process is to be repeated (block 714), control returns to block 702. Otherwise, the instructions of FIG. 7 end.

Figure 8B:
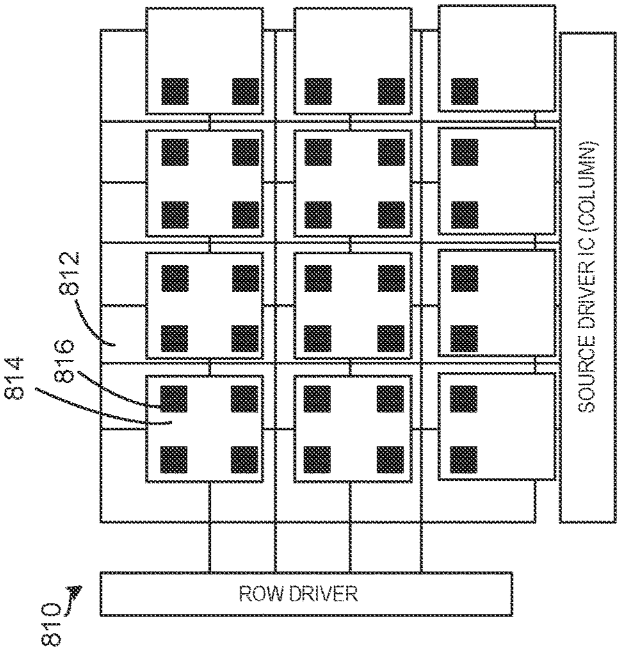
FIGS. 8A-8C depict example pixel arrangements and/or groupings that can be used to implement example displays disclosed herein.
Figure 8A:
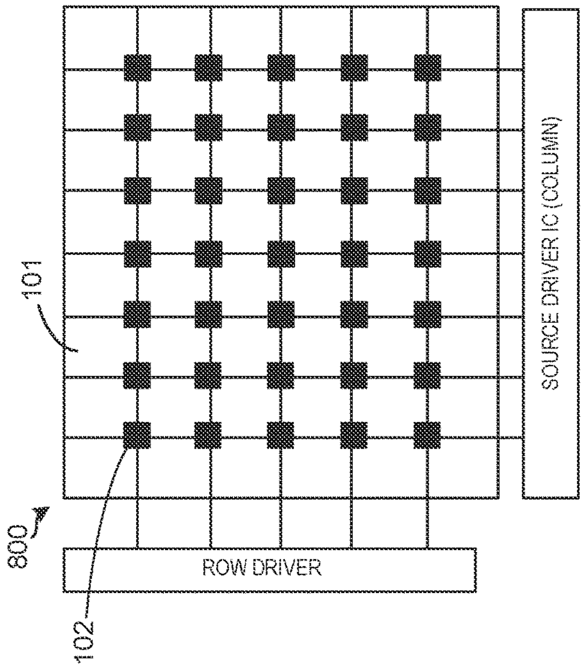
Figure 8C:
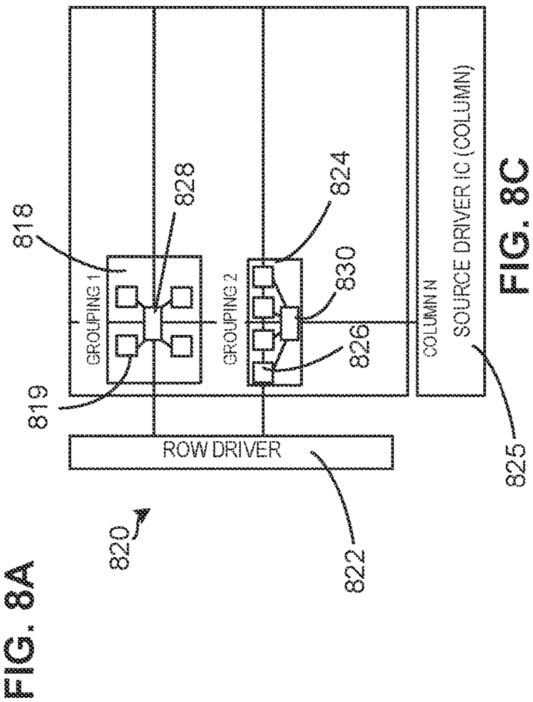

FIGS. 8A-8C depict example pixel arrangements and/or pixel grouping structures that can be implemented in examples disclosed herein. Turning to FIG. 8A, the example display backplane 101 is shown with pixels 102 located thereon. In this example, the pixels 102 are driven individually based on respective rows and columns thereof. In other words, in this example, each one of the pixels 102 includes memory integrated therewith. In contrast, the examples of FIGS. 8B and 8C depict pixels that are grouped together (e.g., defining a "super pixel"). In the examples of FIGS. 8B and 8C, a group of pixels is driven by a single memory and/or associated circuitry. In some examples, the group of pixels includes multiple emitters that emit the same color of light (e.g., two or more emitters that emit red color light, green color light, or blue color light).

Turning to FIG. 8B, a grouped example pixel arrangement 810 is shown. In this example, a display backplane 812 has pixel groupings 814 with pixels 816 mounted thereon. In this example, a spatial arrangement of the pixel groupings 814 defines a rectangular grid of the pixels 816. In the illustrated example, a single micro circuit and memory drive the pixels 816 of the pixel groupings 814. In other examples, the pixels 816 can be arranged in a circular or elliptical arrangement to one another. In yet other examples, the pixels 816 can be arranged in a triangular or linear arrangement to one another.

FIG. 8C depicts an example pixel arrangement 820. In this example, a row driver 822 and a source driver 825 are shown along with the pixel grouping 818 having the corresponding pixels 819. Further, a pixel grouping 824 with corresponding pixels 826 is depicted. In this example, the pixel grouping 818 includes memory (e.g., memory with micro circuits) 828 while the pixel grouping 824 includes memory 830. In operation, the pixels 819 are driven by the memory 828, and the pixels 824 are driven by the memory 830, thereby enabling power-efficient and more responsive operation of the pixels 819, 826. In some examples, pixel groupings are arranged differently (e.g., in a grid of pixels vs. a line of pixels, etc.) along the same corresponding display backplane.

Figure 9:
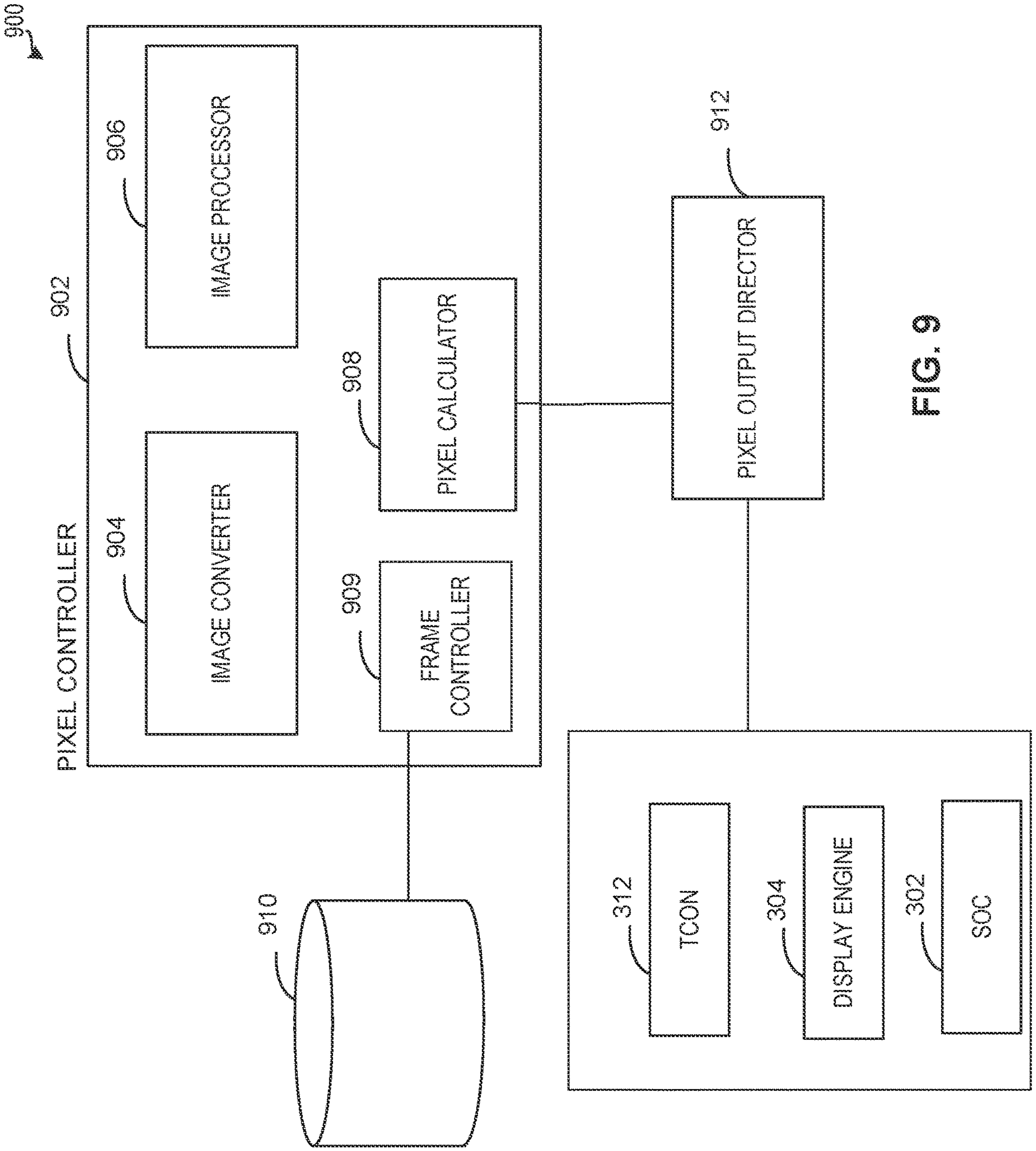
FIG. 9 is a schematic overview of an example display control system that can be implemented in circuit with example displays disclosed herein.

FIG. 9 is a schematic overview of an example display control system 900 that can be implemented in circuit with example displays disclosed herein. The example display control system 900 can be implemented in the display backplane 101, the display engine 304 and/or the SOC 302 shown in FIG. 3. In some other examples, the example display control system 900 is implemented on the display backplane 101 and/or at least one of the pixels 102. The display control system 900 of the illustrated example includes a pixel controller 902 which, in turn, includes an image converter 904, an image processor 906, a frame controller 909, and a pixel calculator 908. Further, the pixel controller 902 and/or the frame controller 909 is in circuit with a data store (e.g., a pixel buffer, a frame buffer, a video buffer, a pixel data storage, etc.) 910. In some examples, the pixel controller 902 and/or the pixel calculator 908 is communicatively coupled to a pixel output director 912, which can interface with the display backplane 101, the TCON 312, the row driver 316 and/or the source driver 318 of FIGS. 3-5 to direct operation of the display 100. In this example, the pixel output director 912 is in circuit with the TCON 312, the display engine 304 and/or the SOC 302.

The image processor 906 of the illustrated example receives image and/or video data. In this example, the image processor 906 receives data pertaining to a video (e.g., a video file). In some examples, the image processor 906 analyzes whether at least portions of the data are to be processed for pixel data.

The example image converter 904 converts the image and/or video data to frame data (e.g., frame pixel information, pixel state data, etc.). For example, the image converter 904 can convert the image and/or video data to states (e.g., color states, intensity states, on/off states, etc.) of the pixels 102. In some examples, the image converter 904 outputs serial data to the pixels 102 (FIGS. 1, 4-6 and 8A) and/or their corresponding memory 404 (FIGS. 4-6).

In this example, the frame controller 909 controls storage of and/or analyzes data received from the image converter 904. In this example, the frame controller 909 directs data (e.g., pixel data) to be stored in the memory 404 (e.g., frame and/or pixel data to be cached in the memory 404) of the pixel 102 of FIG. 4. In some examples, frame or pixel information pertaining to the image and/or video data from the aforementioned frame data is determined. In some examples, the frame controller 909 stores frame data (e.g., frame buffer data, pixel data, pixel frame data, etc.) in the data store 910.

The example pixel calculator 908 determines instructions (e.g., state instructions) pertaining to each of the pixels 102 based on the frame data. For example, the pixel calculator 908 determines operational sequences for the pixels 102 based on timing. In some examples, the pixel calculator 908 operates in conjunction with the TCON 312.

The example pixel output director 912 directs data (e.g., pixel data, instruction data) to be forwarded to the pixels 102. In this example, the pixel output director 912 directs forwarding of pixel data to the memory 404 of the pixels 102. In some examples, the pixel output director 912 determines which of the pixels 102 are to receive specific data (e.g., data parcels).

While an example manner of implementing the example display control system 900 is illustrated in FIG. 9, one or more of the elements, processes and/or devices illustrated in FIG. 9 may be combined, divided, re-arranged, omitted, eliminated and/or implemented in any other way. Further, the example image converter 904, the example image processor 906, the example frame controller 909, the example pixel calculator 908, the example timing controller 312, the example display engine 304, the example SOC 302 and/or, more generally, the example display control system 900 of FIG. 9 may be implemented by hardware, software, firmware and/or any combination of hardware, software and/or firmware. Thus, for example, any of the example image converter 904, the example image processor 906, the example frame controller 909, the example pixel calculator 908, the example timing controller 312, the example display engine 304, the example SOC 302 and/or, more generally, the example display control system 900 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example image converter 904, the example image processor 906, the example frame controller 909, the example pixel calculator 908, the example timing controller 312, the example display engine 304, and/or the example SOC 302 is/are hereby expressly defined to include a non-transitory computer readable storage device or storage disk such as a memory, a digital versatile disk (DVD), a compact disk (CD), a Blu-ray disk, etc. including the software and/or firmware. Further still, the example display control system 900 of FIG. 9 may include one or more elements, processes and/or devices in addition to, or instead of, those illustrated in FIG. 9, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 10:
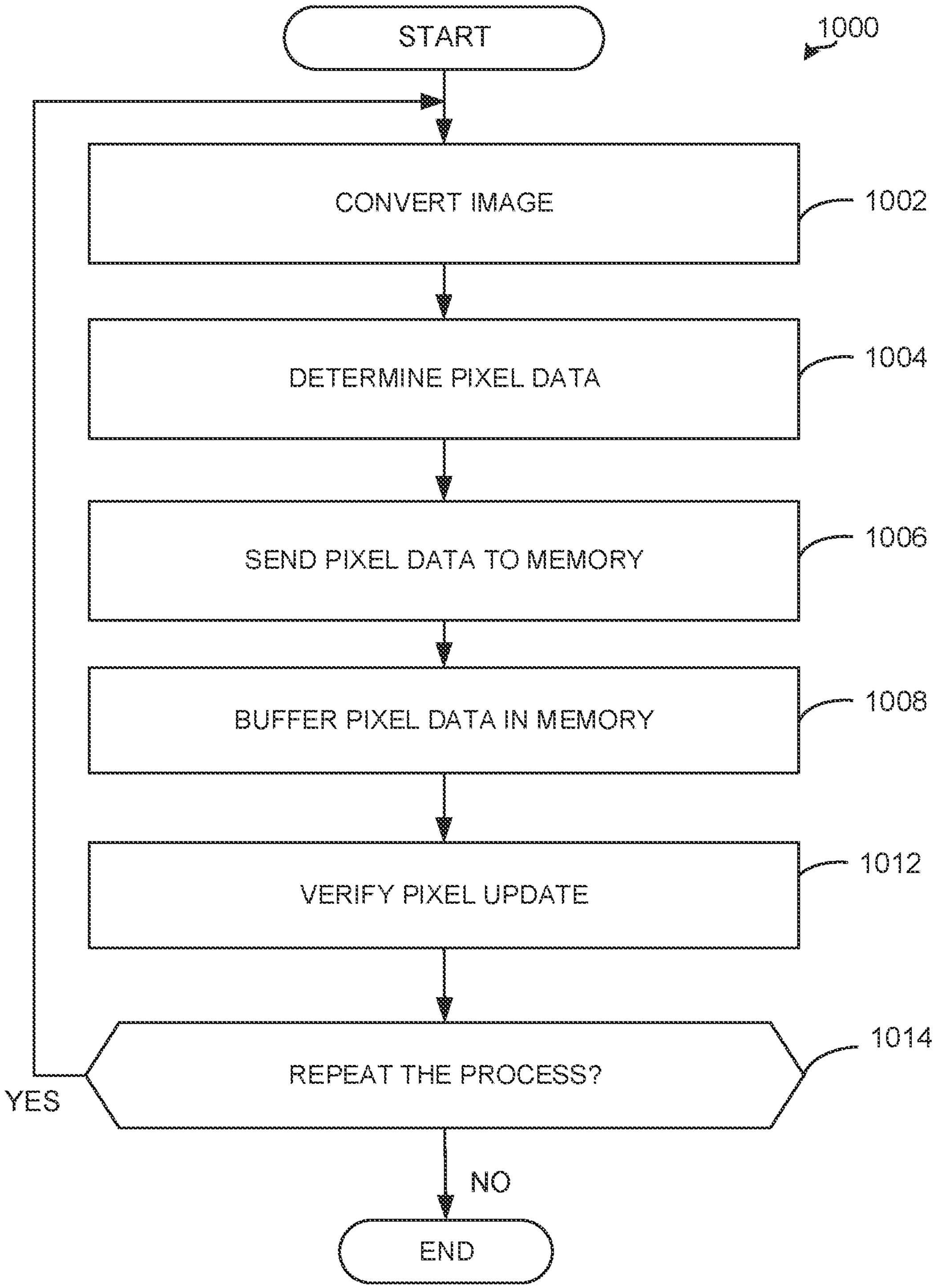
FIG. 10 is a flowchart representative of machine readable instructions which may be executed to implement the example display control system of FIG. 9, the example display of FIG. 1, the example display controller of FIG. 3, the example display system of FIG. 4 and/or the example pixels of FIGS. 2A-2B and 5.

A flowchart representative of example hardware logic, machine readable instructions, hardware implemented state machines, and/or any combination thereof for implementing the display control system 900 of FIG. 9 is shown in FIG. 10. The machine readable instructions may be one or more executable programs or portion(s) of an executable program for execution by a computer processor and/or processor circuitry, such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIG. 10, many other methods of implementing the example display control system 900 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 10 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The example method 1000 of FIG. 10 begins as the pixels 102 (FIGS. 1, 4-6 and 8A) located on the display backplane 101 (FIGS. 1, 4, 6, 8A) are being operated. In this example, the pixels 102 are being operated based on pixel data from their respective integrated memory 404 (FIGS. 4-6). The pixels 102 utilize the pixel data in conjunction with timing information (e.g., clock information, timing data, counter information, etc.). The pixel data can include timer-corresponding pixel instructions that define a sequence of states or operations of the pixels 102 based on the timing information.

At block 1002, the example image converter 904 (FIG. 9) and/or the image processor 906 converts the image and/or video data to frame data.

At block 1004, the example image processor 906 (FIG. 9) determines pixel data from the frame data. In the illustrated example, the image processor 906 determines pixel operating information (e.g., pixel sequences) based on the frame data from the image converter 904.

At block 1006, the example pixel output calculator 908 (FIG. 9) and/or the example pixel output director 912 sends the aforementioned pixel data to be stored (e.g., temporarily stored) in the memory 404 of the pixels 102 (FIGS. 1, 4-6 and 8A). The pixel data can include and/or be associated with buffered pixel data and/or frame data for the pixels 102 (e.g., row and column pixel data for ones of the pixels 102), for example.

At block 1008, in the illustrated example, the pixel output director 912 buffers and/or caches the pixel data in the memory 404. In some such examples, the buffered pixel data includes pixel data as function of time and/or timing information from the TCON 312 and/or the counter 410.

At block 1012, in the illustrated example, the pixel output director 912 verifies update(s) and/or operation of the pixels 102. For example, the pixel output director 912 verifies that the pixels 102 have properly executed the pixel data and/or pixel instructions stored in the respective memory 404 and updated intensity levels of the pixels 102. In some examples, such verifying is based on verification data of ones of the pixels 102 retrieved from the memory 404.

At block 1014, the example TCON 312 determines whether to repeat the process. If the process is to be repeated (block 1014), control returns to block 1002. Otherwise, the example process of FIG. 10 ends.

Figure 11:
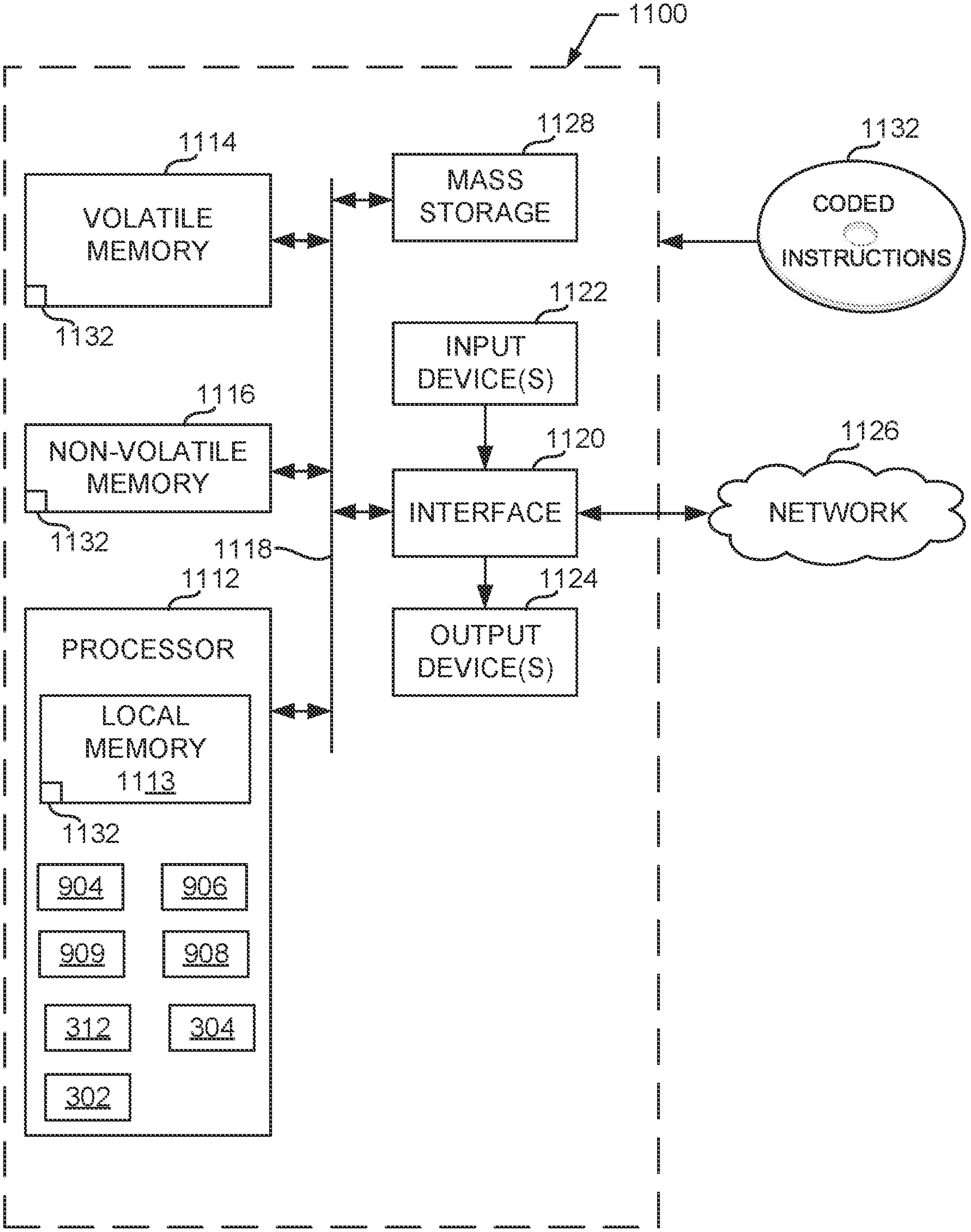
FIG. 11 is a block diagram of an example processing platform structured to execute the instructions of FIG. 10 to implement the example display control system of FIG. 9, the example display of FIG. 1, the example display controller of FIG. 3, the example display architecture of FIG. 4 and/or the example pixel circuitry of FIGS. 2A-2B and 5, and/or execute the instructions of FIG. 7 to manufacture examples displays disclosed herein.

FIG. 11 is a block diagram of an example processor platform 1100 structured to execute the instructions of FIGS. 7 and/or 10 to implement the example display system 400 of FIG. 4 and/or the display control system 900 of FIG. 9. The processor platform 1100 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example image converter 904, the example image processor 906, the example frame controller 909, the example pixel calculator 908, the example timing controller 312, the example display engine 304, and the example SOC 302.

The processor 1112 of the illustrated example includes a local memory 1113 (e.g., a cache). The processor 1112 of the illustrated example is in communication with a main memory including a volatile memory 1014 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIG. 10 may be stored in the mass storage device 1128, in the volatile memory 1114, in the non-volatile memory 1116, and/or on a removable non-transitory computer readable storage medium such as a CD or DVD.

Example 1 includes an integrated memory pixel. The pixel includes a light emitter on a semiconductor substrate, memory co-located with the light emitter on the same semiconductor substrate, and a comparator in circuit with the memory, the comparator to control a flow of electrical current to the light emitter based on pixel data from the memory and timing information.

Example 2 includes the pixel as defined in example 1, wherein the comparator is separate from a second comparator corresponding to a second light emitter on the semiconductor substrate.

Example 3 includes the pixel as defined in example 1, wherein the pixel is a first pixel, and further including a second pixel in circuit with the memory to define a grouping of pixels that includes the first pixel and the second pixel.

Example 4 includes the pixel as defined in example 1, further including a counter in circuit with the comparator.

Example 5 includes the pixel as defined in example 1, wherein the light emitter is a first light emitter that emits a red color light, and further including a second light emitter that emits a green color light and a third light emitter that emits a blue color light.

Example 6 includes the pixel as defined in example 5, wherein the comparator is a first comparator and further including second and third comparators, the first comparator in circuit with the first light emitter, the second comparator in circuit with the second light emitter, the third comparator in circuit with the third light emitter.

Example 7 includes the pixel as defined in example 6, further including a counter in circuit with the first, second and third comparators.

Example 8 includes the pixel as defined in example 5, wherein the first, second and third light emitters are micro light emitting diodes (μLEDs).

Example 9 includes the pixel as defined in example 1, wherein the memory is to receive column and row data pertaining to an image to be displayed.

Example 10 includes an apparatus including a display backplane, a semiconductor substrate including a light emitter corresponding to a pixel, memory in circuit with the light emitter, the memory to store pixel data corresponding to the pixel, and a comparator in circuit with the memory, the comparator to control a flow of electrical current to the light emitter based on the pixel data from the memory and timing information.

Example 11 includes the apparatus as defined in example 10, wherein the comparator is separate from a second comparator corresponding to a second light emitter on the semiconductor substrate.

Example 12 includes the apparatus as defined in any of examples 10 or 11, further including a row driver, the row driver including a counter in circuit with the comparator.

Example 13 includes the apparatus as defined in any of examples 10 to 12, wherein the memory includes static random access memory (SRAM).

Example 14 includes the apparatus as defined in any of examples 10 to 11 or 13, wherein the semiconductor substrate includes a counter in circuit with the comparator.

Example 15 includes the display as defined in any of examples 10 to 11 or 13, further including a column driver, the column driver including a counter in circuit with the comparator.

Example 16 includes a method of producing a memory pixel. The method includes locating a light emitter on a semiconductor substrate of a pixel, locating memory on the same semiconductor substrate in circuit with the light emitter, and locating a comparator on the semiconductor substrate, the comparator in circuit with the memory, the comparator to control a flow of electrical current to the light emitter based on data of the memory and timing information.

Example 17 includes the method as defined in example 16, further including coupling the pixel to a display backplane via a micro transfer process.

Example 18 includes the method as defined in any of examples 16 or 17, wherein the locating of the memory on the semiconductor substrate includes fabricating the memory on the semiconductor substrate.

Example 19 includes the method as defined in any of examples 16 to 18, wherein the locating of the comparator on the semiconductor substrate includes fabricating the comparator on the semiconductor substrate.

Example 20 includes the method as defined in any of examples 16 to 19, wherein the light emitter is a first light emitter and the comparator is a first comparator, and further including locating second and third light emitters on the substrate, and locating second and third comparators on the semiconductor substrate.

Example 21 includes a non-transitory computer readable medium comprising instructions which, when executed, cause at least one processor to determine pixel data based on frame data, store the pixel data on memory of a pixel on a display backplane, the memory located on a semiconductor substrate of the pixel, the memory co-located with a light emitter on the semiconductor substrate, and control a flow of electrical current to the light emitter of the pixel based on the pixel data and timing information.

Example 22 includes the non-transitory computer readable medium as defined in example 21, wherein the instructions are to cause the at least one processor to buffer the pixel data in the memory.

Example 23 includes the non-transitory computer readable medium as defined in any of examples 21 or 22, wherein the instructions are to cause the at least one processor to control a group of pixels based on second instructions in the pixel data.

Example 24 includes the non-transitory computer readable medium as defined in any of examples 21 to 23, wherein the instructions are to cause the at least one processor to convert at least one of image or video data to the pixel data.

From the foregoing, it will be appreciated that example methods, apparatus and articles of manufacture have been disclosed to make cost-effective, responsive and low-cost displays. The disclosed methods, apparatus and articles of manufacture improve the efficiency of using a computing device by enabling distributed and discretized computing and/or execution of pixel instructions. Examples disclosed herein can also exhibit superior brightness and color. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A pixel circuitry array comprising:

first pixel circuitry including:

a first light emitter on a first semiconductor substrate;

memory co-located with the light emitter on the first semiconductor substrate; and a first comparator in circuit with the memory, the first comparator to control a flow of electrical current to the first light emitter based on pixel data from the memory and timing information; and second pixel circuitry including:

a second light emitter on a second semiconductor substrate separate from the first semiconductor substrate; and a second comparator on the second semiconductor substrate to control a flow of electrical current to the second light emitter based on the pixel data from the memory on the first semiconductor substrate and the timing information.

2. The pixel circuitry array as defined in claim 1, wherein the first pixel circuitry is in circuit with the second pixel circuitry via a display backplane.

3. The pixel circuitry array as defined in claim 1, further including a counter in circuit with the comparator.

4. The pixel circuitry array as defined in claim 1, wherein the first light emitter that emits a red color light, and further including a third light emitter of the first pixel circuitry that emits a green color light and a fourth light emitter of the first pixel circuitry that emits a blue color light.

5. The pixel circuitry array as defined in claim 4, further including third and fourth comparators of the first pixel circuitry, the third comparator in circuit with the third light emitter, the fourth comparator in circuit with the fourth light emitter.

6. The pixel circuitry array as defined in claim 5, further including a counter in circuit with the first, third and fourth comparators.

7. The pixel circuitry array as defined in claim 4, wherein the first, third and fourth light emitters are micro light emitting diodes (μLEDs).

8. The pixel circuitry array as defined in claim 1, wherein the memory is to receive column and row data pertaining to an image to be displayed.

9. An apparatus comprising:

a display backplane;

a first semiconductor substrate including:

a first light emitter corresponding to a first pixel;

memory in circuit with the first light emitter, the memory to store pixel data, and a first comparator in circuit with the memory, the first comparator to control a flow of electrical current to the first light emitter based on the pixel data from the memory and timing information; and a second semiconductor substrate separate from the first semiconductor substrate, the second semiconductor substrate including:

a second light emitter corresponding to a second pixel; and a second comparator in circuit with the memory via the display backplane, the second comparator to control a flow of electrical current to the second light emitter based on the pixel data and the timing information corresponding to the memory on the first semiconductor substrate of the first pixel.

10. The apparatus as defined in claim 9, further including a row driver, the row driver including a counter in circuit with at least one of the first comparator or the second comparator.

11. The apparatus as defined in claim 9, wherein the memory includes static random access memory (SRAM).

12. The apparatus as defined in claim 9, wherein the at least one of the first semiconductor substrate or the second semiconductor substrate further includes a counter in circuit with the first comparator and the second comparator.

13. The apparatus as defined in claim 9, further including a column driver, the column driver including a counter in circuit with the at least one of the first comparator or the second comparator.

14. A method of producing a memory pixel array, the method comprising:

locating a first light emitter on a first semiconductor substrate of a first pixel;

locating memory on the first semiconductor substrate in circuit with the light emitter;

locating a first comparator on the first semiconductor substrate, the comparator in circuit with the memory, the comparator to control a flow of electrical current to the first light emitter based on data of the memory and timing information;

locating a second light emitter on a second semiconductor substrate of a second pixel; and locating a second comparator on the second semiconductor substrate to communicatively couple the second comparator to the memory on the first semiconductor substrate of the first pixel, the second comparator to control a flow of electrical current to the second light emitter based on data of the memory and timing information.

15. The method as defined in claim 14, further including coupling the first and second pixels to a display backplane via a micro transfer process.

16. The method as defined in claim 14, wherein the locating of the memory on the first semiconductor substrate includes fabricating the memory on the first semiconductor substrate.

17. The method as defined in claim 14, wherein the locating of the first comparator on the first semiconductor substrate includes fabricating the first comparator on the semiconductor substrate.

18. The method as defined in claim 14, further including:

locating third and fourth light emitters on the first semiconductor substrate; and locating third and fourth comparators on the first semiconductor substrate.

19. A non-transitory computer readable medium comprising instructions which cause at least one processor circuit to:

determine pixel data based on frame data;

store the pixel data on memory of a first pixel on a display backplane, the memory located on a first semiconductor substrate of the first pixel, the memory co-located with a first light emitter on the first semiconductor substrate; and control a flow of electrical current to a second light emitter of a second semiconductor substrate of a second pixel on the display backplane based on the pixel data of the memory on the first semiconductor substrate of the first pixel and timing information.

20. The non-transitory computer readable medium as defined in claim 19, wherein the instructions are to cause one or more of the at least one processor circuit to buffer the pixel data in the memory.

21. The non-transitory computer readable medium as defined in claim 19, wherein the instructions are to cause one or more of the at least one processor circuit to control the first and second pixels based on second instructions in the pixel data.

22. The non-transitory computer readable medium as defined in claim 19, wherein the instructions are to cause one or more of the at least one processor circuit to convert at least one of image or video data to the pixel data.

* * * * *